Aug. 13, 1940.　　　　E. CANNON　　　　2,211,406
CONTROL SYSTEM FOR HYDRAULIC POWER TRANSMISSION UNITS
Filed July 28, 1936　　　2 Sheets-Sheet 1

INVENTOR
Earl Cannon
BY
ATTORNEY

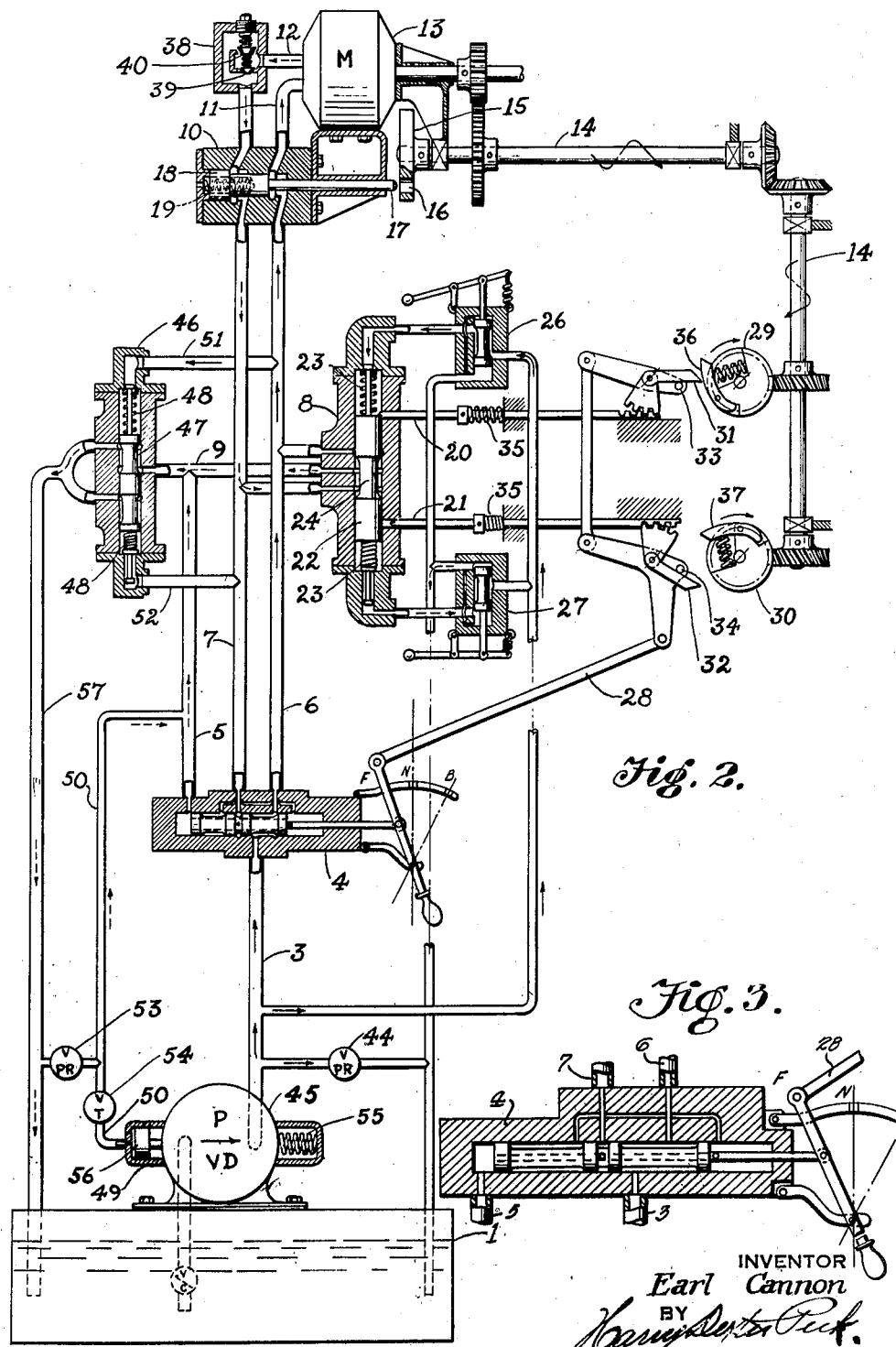

Patented Aug. 13, 1940

2,211,406

UNITED STATES PATENT OFFICE 2,211,406

CONTROL SYSTEM FOR HYDRAULIC POWER TRANSMISSION UNITS

Earl Cannon, Rockville Centre, N. Y., assignor, by mesne assignments, to Reconstruction Finance Corporation, Minneapolis, Minn., a corporation of the United States Application July 28, 1936, Serial No. 92,990

8 Claims. (Cl. 60—53)

This invention relates to a hydraulic power transmission unit and the control system therefor.

It particularly relates to a system in which a reversible hydraulic motor is cyclically operated in either direction as required for a predetermined extent.

With liquid used as the power transmission fluid in my unit, its operation is quiet, smooth in acceleration and deceleration and at all times under the control of the operator.

The pump and motor are preferably of the rotary piston type, the pump being driven continuously at constant speed with the hydraulic motor operating only when required.

The smooth, yet positive, acceleration and deceleration of such a hydraulic power transmission unit from and to a given position is a serious problem due in part to the large inertia of the rotating portions of the hydraulic motor. The novel combination of means that I teach takes care of this by so moving the controlling means as to produce the required acceleration. I relate the speed of the pump to that of the means governing the action of the means controlling the rate of acceleration of the hydraulic motor. In other words, the discharge rate of the main pump, or another moving with it, governs the speed of a piston that either operates a by-pass with a fixed stroke pump or alters the stroke of a variable discharge pump, either of which operations affects the discharge to the hydraulic motor in a predetermined manner.

A feature of this invention is the use of a by-passing latch valve that bypasses the flow of the pump except when the piston of the latch valve has been thrown off center by the action of either pilot valve connected to its respective end. The stopping of the motor at a predetermined position results from the action of timing means operated by the motor to remove the latches from functioning.

Another object of the invention is to provide interlocking means which act to prevent starting the device in operation by moving the wrong pilot, considering the intended direction of motion. In other words, my main aim is to provide a safe and foolproof whole.

Other features have to do with means for mechanically and hydraulically locking the unit in a predetermined position whenever it is not operating.

Other features include the interlock between the reverse valve which determines the direction of motion, the timing means which stops the motion, and the pilots which start the unit.

Further objects and features of my invention will be more fully set forth in the specification and claims.

In the drawings:

Fig. 2 is a similar view, using a variable discharge pump.

Fig. 3 is a partial view similar to Fig. 1 showing valve 4 and connections on an enlarged scale;

Figures 1, 4:
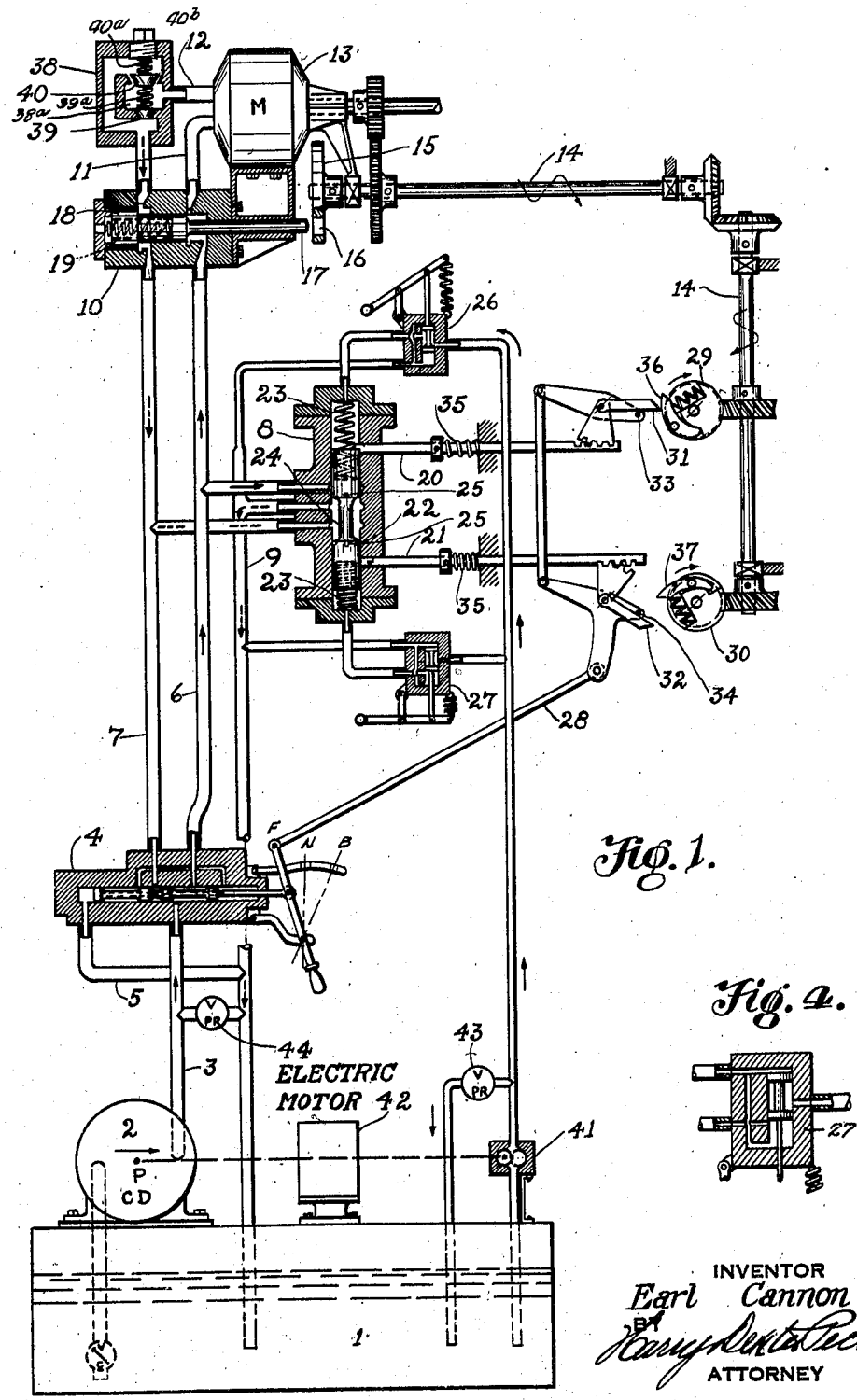
Fig. 1 is a somewhat diagrammatic elevation, partially in section, of my invention when using a constant discharge pump.
Fig. 4 is a partial view similar to Fig. 1 showing valve 27 and connections on an enlarged scale.

In Fig. 1, the piston for the latch valve is provided with throttling grooves which are moved past the shut-off edge of a bypassing port at a predetermined rate; while in Fig. 2, the piston of the variable stroke adjuster of the pump is moved at a predetermined rate to increase its discharge. In both cases this predetermined rate is related to the pump speed.

Description, Fig. 1

Referring to Fig. 1, the hydraulic circuit is as follows:

Oil is pumped from reservoir 1 by pump 2 into pressure line 3 connecting the pump with reverse valve 4. When in "neutral," this valve exhausts oil freely into exhaust line 5 to the reservoir. For "forward" motion the oil pressure is connected with line 6, and for "back" motion with line 7. Both lines 6 and 7 connect reverse valve 4 with latch valve 8. When the unit is not in operation, the oil is bypassed freely by latch valve 8 to the exhaust line 9. Lines 6 and 7 are also connected to holding valve 10 and thence by corresponding lines 11 and 12 to hydraulic motor 13. Hydraulic motor 13 operates timing shaft 14 having an affixed disc 15 containing a positioning hole 16 for holding pin 17 actuated by compound piston 18 of holding valve 10.

In holding valve 10, compound piston 18 is at all times acted upon by the pressure in lines 6 and 7 connecting valve 10 to latch valve 8. Spring 19 resiliently opposes the motion of piston 18 due to such pressure so that piston 18 uncovers the ports to lines 11 and 12 to hydraulic motor 13 only when such pressure is sufficient to cause the operation of motor 13. Piston 18 is extended to form holding pin 17 which is arranged adjacent to disc 15 affixed to timing shaft 14. The end of pin 17 is adapted to act as a brake on the face of disc 15 until it drops into hole 16. As shown, both hole 16 and the end of its holding pin 17 are made cylindrical, of slightly differing diameters, so as to definitely bring hydraulic motor 13 to within given limits of its predetermined position at the end of each cycle of operation.

Reverse valve 4 and timing shaft 14 are both operatively connected to latch valve 8 so that, when the reverse valve is in its "neutral" position, neither latch 20 nor 21 can be engaged; and when the reverse valve is in its "forward" position, the timing shaft can not affect the backing latch 21; likewise, when the reverse valve is in its "back" position, the timing shaft can not affect the forward latch 20.

Latch valve 8 has piston 22 centered by springs 23. Between the two ends of piston 22 is a section of reduced area 24 for bypassing the flow from lines 6 and 7 through 9 whenever piston 22 is in its central position, and from either line 6 or 7 through 9 whenever piston 22 is not in its central position. Grooves 25 are provided to absorb the hydraulic shock otherwise occurring when the piston is moved away from its central, bypassing position. Pilots 26 and 27, respectively for causing lines 6 and 7 to be effective, are connected as shown to the ends of latch valve 8. Admitting pressure to either end while the opposite end is connected with the exhaust will permit piston 22 to throw past latch 20 or 21 depending on whether either of the forward or back pilots 26 or 27 is connected to pressure.

Interlock link 28 connects reverse valve 4 with latch valve 8 so that this reverse valve 4 dominates the action of the entire unit. Timing shaft 14 has rigidly mounted thereon spiral gears for driving the forward and back cams 29 and 30. These are so adapted and arranged as to move respectively the latch trigger portions 31 and 32 in the proper direction. The longitudinal motion of the latches 20 and 21 is converted into a tilting motion of trigger portions 31 and 32.

Reverse valve 4 is connected by link 28 with levers having latch detent pins 33 and 34 respectively. The general arrangement of the mechanical link 28, trip cams 29 and 30, latch triggers 31 and 32 and detents 33 and 34 is such that the latches are positively held out when the reverse valve is in "neutral" and the back latch 21 is held out by detent 34, acting against trigger 32, away from cam 30 when the reverse valve is in its "forward" position; trigger 31 then being in the path of forward cam 29 and detent 33 being out of the way. When reverse valve 4 is set in its "back" position, trigger 32 is in the path of cam 30, trigger 31 being held out of the path of forward cam 29 by detent 33. Spring 35 is provided for each of latches 20 and 21 so that either latch is forced in behind piston 22 whenever this is drawn out of its centered, bypassing position. Spring-pressed trips 36 and 37 permit the cams 29 and 30 to be ineffective when striking their respective triggers 31 and 32 when moving in the opposite direction from that in which they must be effective.

Overruning valve 38 is provided in either of lines 11 or 12 (shown in line 12) between hydraulic motor 13 and holding valve 10. It consists of one spring loaded valve 39 having a spring 39a pressing on the top thereof, which engages at its upper end another valve 40 disposed in a valve seat formed in the upper wall of compartment 38a from which pipe 12 leads. Valve 40 is pressed upon at its top by a spring 40a, the pressure of which may be adjusted by a headed screw 40b. When liquid is being delivered to motor 13 through pipe 11, as indicated by the arrows in Fig. 1, said liquid will pass from motor 13 through pipe 12 into compartment 38a and will pass out through valve 40 into the main compartment of valve 38 and out through pipe 7. When the pressure on the motor falls below that of spring 40a, valve 40 will be closed. The motor therefore cannot continue to run at a pressure of liquid lower than the pressure of spring 40a. Overrunning of the motor is therefore prevented by action of valve 40. When the liquid is being supplied to motor 13 as stated, by pipe 11, valve 39 will, of course, be held closed by the pressure of the liquid.

When the motor is being supplied with liquid from pipe 7 the same will pass into the main compartment of valve 38 and will pass upwardly through valve 39 into compartment 38a, through pipe 12 into the motor and will pass from the motor out through pipe 11. The pressure of the liquid on top of valve 40 and the pressure of spring 40a will hold valve 40 closed. Valve 39 is lifted against the pressure of spring 39a. When the pressure in pipe 7 diminishes below that of spring 39a valve 39 will close and the motor will be prevented from running at a low pressure. Liquid cannot be supplied to the motor at a pressure below that determined by spring 39a and overrunning of the motor at a pressure below that determined by spring 39a is thus prevented. Overrunning of the motor in either direction is therefore minimized. Valve 38 consequently minimizes overrunning of the hydraulic motor in either direction when latch valve 8 is in its bypassing position. When a biasing normal load exists, the spring on one valve is made stronger than that on the other so as to cause overrunning valve 38 to resist motion more strongly in the direction of the load than in the opposite direction.

Pilot pump 41 is continuously driven by the same electric motor 42 as is main pump 2. These pumps respectively have pilot pressure relief valve 43 and main pressure relief valve 44 for limiting the maximum pressure by bypassing any flow above said pressure. Pilot relief valve 43 is preferably set at approximately 100 pounds per square inch and operates continuously except for the small period of time when the pilots 26 and 27 are taking fluid. Pilot pump 41 is preferably of the gear type which gives a constant discharge rate so that piston 22 of latch valve 8 is operated at a definite speed as soon as either pilot is placed in its pressure position while the other remains in its exhaust position. In this way, the cushioning action of grooves 25 is most reliably related to the desired acceleration of hydraulic motor 13. On the other hand, relief valve 44 for main pump 2 is preferably set to operate, with modern rotary piston-type pumps, at approximately 2000 pounds per square inch. This relief valve 44 preferably does not operate except when an excessive load is on the motor, relief valve 44 acting purely as a safety valve. However, when the load on motor 13 varies widely from that anticipated in the design of cushioning grooves 25, pressure relief valve 44 may be set at a lower value, say 1250 pounds per square inch, which will carry the load at speed and yet limit the acceleration to a desired value. In this case, it is apparent that pressure relief valve 44 will normally operate at least during the accelerating portion of each cycle of operation of hydraulic motor 13.

Operation, Fig. 1

The operation of the preferred embodiment of my invention, shown in Fig. 1, is as follows:

With reverse valve 4 in "neutral," the flow from pump 2 to line 3 is bypassed freely to exhaust line 5. Consequently, the operation of latch valve 8 from its bypassing position can neither cause nor permit operation of hydraulic motor 13 since no pressure is available to force back compound piston 18 of holding valve 10, thus, hydraulic motor 13 can not turn as long as reverse valve 4 is in "neutral" even though either pilot 26 or 27 be actuated to throw piston 22 of latch valve 8 away from its bypassing position. In addition, link 28, connected with reverse valve 4, holds latch detents 33 and 34 against latch triggers 31 and 32 so that latches 20 and 21 are both held clear of piston 22 of latch valve 8 so that it cannot be latched as long as reverse valve 4 is in its "neutral" position.

With reverse valve 4 in its "forward" position, link 28 positions detent 34 to remove trigger 32 from the path of back cam 30. This ensures that latch 21 can not act to hold piston 22 of latch valve 8 in the event of an improper operation of back pilot 27. At the same time, link 28 positions detent 33 so that trigger 31 is in the path of forward cam 29. When both pilots 26 and 27 are in similar positions: either exhaust or pressure, piston 22 will have its bypass opening 24 connected simultaneously to pressure lines 6 and 7 and to exhaust line 9. Further, when back pilot 27 only is improperly brought to its pressure position thus throwing piston 22 away from its central position, the opening 24 will still leave pressure line 6 freely connected with exhaust line 9 so that no pressure can reach holding valve 10 to open it; consequently, hydraulic motor 13 can not operate under this condition. However, when forward pilot 26 only is brought to pressure position, piston 22 of latch valve 8 is moved by the discharge from pilot pump 41 to gradually shut off the bypassing connection between lines 6 and 9 by the throttling grooves 25 so that pressure is applied to holding valve 10 through pipe 6 and thence gradually to motor 13 by line 11. At the same time, holding pin 17 is withdrawn from its position in hole 16 so that the motor starts smoothly and with the required acceleration as soon as this interlock is free. The motor will then turn timing shaft 14 through one complete revolution of operation since forward cam 29 turns with timing shaft 14 and strikes trigger 31 to remove latch 20 from behind piston 22 to thus permit spring 23 to center it, both pilots 26 and 27 being in their exhaust positions, so that the pressure from line 6 is bypassed freely back to exhaust line 9 which causes piston 18 of holding valve 10 to stop hydraulic motor 13 and push holding pin 17 into positioning hole 16 on disc 15 of timing shaft 14.

With reverse valve 4 in its "back" position, the operation is as above described, under the "forward'" position, except that the direction of operation of motor 13 and its timing shaft 14 are reversed.

The operation of overrunning valve 38 has been made clear in its description.

In résumé of its operation, my novel hydraulic power transmission unit operates in a thoroughly reliable and fool-proof manner: The hydraulic motor can operate only in the direction set by reverse valve 4; upon the operation of the wrong pilot 26 or 27 with a given setting of reverse valve 4, the hydraulic motor will not operate even though the proper pilot be depressed at the same time; hydraulic motor 13 stops smoothly and unfailingly at the proper position due to the mechanical braking action of the holding valve and the hydraulic braking action of the overrunning valve; in case the power supply from main pump 2 should fail between the ends of any cycle, hydraulic motor 13 would be braked both by the mechanical action of holding pin 17 against the side of disc 15 containing holding hole 16 and also braked hydraulically by the overrunning valve 38; and the operator has control of the unit at all times since he can at any time stop hydraulic motor 13 immediately by bringing reverse valve 4 to its neutral position.

Description, Fig. 2

The embodiment shown in Fig. 2 is generally similar to that of Fig. 1 except that a variable discharge main pump 45 is substituted for the constant discharge pump 2 of Fig. 1 by changing its stroke, stroke control valve 46 being added. Pilot pump 41 is omitted. This combination has the advantage of freeing the acceleration of hydraulic motor 13 from the rate of operation of latch valve 8, which consequently need no longer be provided with grooves 25. Also, the operation in service is improved by the fact that variable stroke pump 45 operates to give a reduced discharge when hydraulic motor 13 is not operating, a great advantage in intermittent cyclical operation.

Stroke control valve 46 contains piston 47 normally centered by springs 48, preferably of the preloaded type as are springs 23 of latch valve 8. Stroke control cylinder 49 on variable stroke pump 45 is connected by pressure pipe 50 to valve 46 and to discharge line 9 from latch valve 8. The ends of valve 46 are connected respectively by lines 51 ando 52 with lines 6 and 7 connecting reverse valve 4 with latch valve 8. Pressure pipe 50 has a pressure relief valve 53 and contains a throttling valve 54 so that the stroke control operates at an adjustable rate determined by the throttling of valve 54, relief valve 53 being set at, say, 300 pounds per square inch. Since the operation of stroke control piston 56 against the opposing spring 55 is well-known in the art, a conventional showing is made to avoid distracting attention from the essence of my invention.

Further, in Fig. 2, line 5 from reverse valve 4 no longer exhausts directly to the reservoir but instead is connected to line 9 connecting latch valve 8 and stroke control valve 46 so that it can exhaust freely through line 57 to reservoir 1 only when piston 47 is thrown off center to an extreme position; at which time the pressure pipe 50 is also connected with exhaust line 57, thus connecting stroke control cylinder 49 to atmospheric pressure.

When the hydraulic motor is not operating and with reverse valve 4 in "neutral," the flow from pump 45 passes through line 3, reverse valve 4, line 5 and pressure pipe 50 containing valve 54, and to stroke control cylinder 49 and relief valve 53 (limiting the maximum pressure that opposes spring 55) so that piston 56 moves its full travel in its cylinder 49 after which the reduced flow passes through relief valve 53 to reservoir 1.

Operation, Fig. 2

The operation of my improved device as shown in Fig. 2 is generally as in Fig. 1 except for the changes incidental to the substitution of the variable stroke pump 45 for the constant discharge type pump 2 used in Fig. 1. These changes are brought out in the following description of operation:

When reverse valve 4 or valve 8 is in "neutral," the flow therefrom passes through lines 5, 9, 6 and 7 so that the same pressure exists in lines 51 and 52 at opposing ends of stroke control valve 46. This permits the centering springs 48 to center piston 47 so that the flow from 9 must bypass valve 46 through pressure pipe 50 to stroke control cylinder 49 and relief valve 53. This up-to-300 pounds per square inch pressure forces the stroke control piston 56 against its spring 55 to short-stroke the variable stroke pump 45 which then gives enough flow for operation of the latch valve 8 by either of pilot valves 26 or 27. Forward pilot 26 is shown depressed to a pressure position in Fig. 2, and the other pilot 27 being in exhaust position, piston 22 of latch valve 8 is thrown to an extreme position, thus permitting latch 20 to drop in behind piston 22 to retain it there after pilot 26 is restored to its normal exhaust position and until forward cam 29 strikes its trigger 31 to retract latch 20 from behind piston 22 of latch valve 8 and thus end the cycle of operation of motor 13. With reverse valve 4 in its "forward" position throwing the flow through line 6, it is apparent that, as long as piston 22 is latched, the main flow must pass through line 6 to holding valve 10 and thus raise its piston 18 so that hydraulic motor 13 will operate. Also, fluid under this pressure passes through line 51 to throw piston 47 of stroke control valve 46 over to connect free exhaust 57 to the flow back from hydraulic motor 13 through line 7 and latch valve 8 and line 9; thus putting atmospheric pressure on line 52 to one end of valve 46, the full operating pressure being carried on its other end through line 51 as long as motor 13 is operating. This atmospheric pressure is likewise seen to be communicated to line 50 so that spring 55 forces piston 56 to move in the stroke control cylinder 49 to give full discharge from the variable stroke pump 45. The operation when the reverse valve is so set that the motor runs backwards is obvious from the foregoing.

The above-mentioned method of operation maintains a supply under pressure to the pilot valves at all times and also makes the acceleration and deceleration of hydraulic motor 13 as smooth as possible. However, these apparent advantages are outweighed in general by the greater inherent simplicity and reliability of my preferred embodiment as shown in Fig. 1. Possible operating objections to the device of Fig. 2 are: full operating pressures are exerted on the pilot valves while motor 13 is in operation; there must be precise calibration of the centering springs in latch valve 8 and stroke control valve 46 for reliability of operation; and finally, in the case of a biasing load on hydraulic motor 13, the operation of stroke control valve 46 may become unreliable except when an uneconomically high back pressure is set up by overrunning valve 38. The use of the embodiment shown in Fig. 2 is properly limited to permanent installations where no necessity exists for minimizing the weight of the unit.

While I have limited the showing of my invention to a uni-directional pump either with fixed or variable discharge and obtain control through a reversing valve, still I do not wish to be limited to this: for example, anyone skilled in the art could readily follow my teachings herein and alternatively use a reversing type variable discharge pump (see Fig. 4 of U. S. Patent Re. 18,149 to Stratton) without departing from my teachings.

I claim:

1. In a hydraulic power transmission system containing a pump, a reversible motor and a fluid-filled circuit operatively connecting them together, the combination of a valve in said circuit between said pump and said motor for determining the direction of motion of said motor, latch valve means in said circuit between said reverse valve and said motor for governing the operation of said motor, holding valve means in said circuit between said latch valve and said motor actuated by the pressure in the supply line to said motor from said latch valve, and mechanical holding means for said motor including means for continuously biasing said holding means, said mechanical holding means being operatively connected to said holding valve so that upon a decrease in said pressure said holding means mechanically brakes said motor.

2. In a system as in claim 1, said holding valve being adapted to shut off at least one of the two lines of said hydraulic motor hydraulically to stop it.

3. In a system as in claim 1, said mechanical holding means being adapted to brake said motor mechanically to bring it practically to a stop within given limits of a predetermined position and said holding means being adapted to be actuated by said biasing means to retain said motor within said limits.

4. In a hydraulic power transmission system containing a uni-directional pump, a reversible motor and a fluid-filled circuit operatively connecting them together, the combination of a latch valve for bypassing the fluid from said hydraulic motor, two pilot means for actuating said valve to a latching position for either a forward or back direction of said motor, means for mechanically latching said valve in either of said positions, a reverse valve for determining the direction of motion of said motor, and a mechanical interlock connecting said reverse valve with said latch valve so that said latch valve can be latched only when the latch valve is operated by the proper pilot and not be latched when the improper pilot is operated even though the proper pilot be simultaneously operated.

5. In a hydraulic power transmission system containing a uni-directional pump, a reversible motor and a fluid-filled circuit operatively connecting them together, the combination of a reverse valve, a latch bypass valve in the lines of said circuit between said reverse valve and said hydraulic motor, said latch valve having an exhaust passing so that both of said lines and said exhaust passage are connected in a bypassing relation when said latch bypass valve is in a centered position, spring means for so centering said latch valve, pilot means for operating said latch valve from said bypassing position to the forward or to the back position when only the corresponding one of said pilot means is operated, and mechanical latching means adapted and arranged to latch said latch valve when it is moved to a position corresponding to the direction set by said reverse valve.

6. In a hydraulic power transmission system containing a uni-directional pump, a reversible motor and a fluid-filled circuit operatively connecting them together, the combination of a reverse valve for determining the direction of motion of said motor; a bypass latch valve for controlling the supply of fluid to said motor; two pilot means each for actuating said latch valve from its bypassing position to cause the motor to operate in its respective direction, said latch valve including means for latching said valve in either direction; timing means actuated by said motor and adapted to unlatch said valve to bring it to a bypassing position from either direction; and interlocking means connecting said reverse valve and said latch valve actuated by said reverse valve and arranged and adapted to predetermine which of said latching and unlatching means is operable according to the then position of said reverse valve.

7. In a control system for a hydraulic power transmission unit having a fluid-filled circuit operatively connecting a continuously operating pump and a motor that operates through a predetermined extent when required, the combination of a bypass valve in said circuit between said pump and said motor for bypassing said motor so that it is fluid-actuated only when said bypass valve is closed and a holding valve connected to both lines of said circuit between said bypass valve and said motor and adapted to function upon a predetermined pressure in either of said lines between said holding valve and said bypass valve to hydraulically hold said motor in its then position during at least a portion of the time said bypassing occurs.

8. In a control system for a hydraulic power transmission unit having a fluid-filled circuit operatively connecting a continuously operating pump and a motor that operates through a predetermined extent when required, the combination of a bypass valve in said circuit between said pump and said motor for bypassing said motor so that it is fluid-actuated only when said bypass valve is closed, a pressure relief valve for limiting the maximum pressure in said hydraulic circuit, a holding valve connected in both lines of said circuit between said bypass valve and said motor and adapted to function until a predetermined pressure is reached in either of said lines between said holding valve and said bypass valve to hydraulically hold said motor in its then position, said predetermined pressure being less than that set by said pressure relief valve.

EARL CANNON.